(12) United States Patent
Carr et al.

(10) Patent No.: US 10,392,951 B2
(45) Date of Patent: Aug. 27, 2019

(54) VANE ASSEMBLY WITH TRAPPED SEGMENTED VANE STRUCTURES

(71) Applicant: United Technologies Corporation, Hartford, CT (US)

(72) Inventors: Jesse M. Carr, Hartford, CT (US); Bryan P. Dube, Columbia, CT (US); Shelton O. Duelm, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 558 days.

(21) Appl. No.: 14/870,122

(22) Filed: Sep. 30, 2015

(65) Prior Publication Data

US 2016/0201488 A1 Jul. 14, 2016

Related U.S. Application Data

(60) Provisional application No. 62/058,801, filed on Oct. 2, 2014.

(51) Int. Cl.
*F01D 5/30* (2006.01)
*F01D 9/04* (2006.01)

(52) U.S. Cl.
CPC ........... *F01D 9/042* (2013.01); *F01D 5/3084* (2013.01); *F01D 9/041* (2013.01); *F05D 2220/32* (2013.01); *F05D 2230/60* (2013.01); *F05D 2240/128* (2013.01); *F05D 2260/30* (2013.01); *F05D 2300/501* (2013.01); *F05D 2300/5021* (2013.01); *Y02T 50/672* (2013.01)

(58) Field of Classification Search
CPC . F01D 9/04; F01D 9/041; F01D 9/042; F01D 5/323; F01D 5/3084; F01D 25/246; Y02T 50/672; F05D 2260/30; F05D 2220/32; F05D 2300/501; F05D 2300/5021; F05D 2240/128; F05D 2230/60
See application file for complete search history.

(56) References Cited

U.S. PATENT DOCUMENTS

| | | |
|---|---|---|
| 3,057,767 A | 10/1962 | Kaplan |
| 3,487,879 A | 6/1970 | McCarthy et al. |
| 3,694,104 A | 9/1972 | Erwin |
| 3,857,649 A | 12/1974 | Schaller et al. |

(Continued)

FOREIGN PATENT DOCUMENTS

| | | |
|---|---|---|
| EP | 1104836 | 6/2001 |
| EP | 2549121 | 1/2013 |
| EP | 2570602 | 3/2013 |

OTHER PUBLICATIONS

European Search Report for European Patent Application No. 15187544 completed Mar. 14, 2016.

(Continued)

*Primary Examiner* — Carlos A Rivera
*Assistant Examiner* — Jesse M Prager
(74) *Attorney, Agent, or Firm* — Carlson, Gaskey & Olds, P.C.

(57) ABSTRACT

A vane assembly includes inner and outer rings, a plurality of segmented vane structures circumferentially-spaced around a central axis and between the inner and outer rings, and at least one spring that mechanically traps the segmented vane structures in radial compression between the inner and outer rings.

15 Claims, 5 Drawing Sheets

(56) References Cited

U.S. PATENT DOCUMENTS

| | | | |
|---|---|---|---|
| 4,076,451 A * | 2/1978 | Jankot | F01D 5/284 |
| | | | 415/200 |
| 4,400,915 A | 8/1983 | Arrigoni | |
| 5,017,092 A | 5/1991 | Violette et al. | |
| 5,163,817 A | 11/1992 | Violette et al. | |
| 5,240,377 A | 8/1993 | Farr | |
| 5,580,219 A | 12/1996 | Frey et al. | |
| 6,213,719 B1 | 4/2001 | Violette et al. | |
| 6,398,485 B1 * | 6/2002 | Frosini | F01D 5/08 |
| | | | 415/115 |
| 6,422,820 B1 | 7/2002 | Anderson et al. | |
| 6,447,250 B1 | 9/2002 | Corrigan et al. | |
| 6,457,942 B1 | 10/2002 | Forrester | |
| 6,481,971 B1 | 11/2002 | Forrester | |
| 7,094,021 B2 | 8/2006 | Haubert | |
| 7,104,758 B2 | 9/2006 | Brock et al. | |
| 7,284,958 B2 | 10/2007 | Dundas et al. | |
| 7,377,749 B2 | 5/2008 | Charrier et al. | |
| 7,393,182 B2 | 7/2008 | Matheny | |
| 7,445,426 B1 | 11/2008 | Matheny et al. | |
| 7,762,781 B1 | 7/2010 | Brown et al. | |
| 7,976,281 B2 | 7/2011 | Keith et al. | |
| 2003/0002979 A1 * | 1/2003 | Koschier | F01D 5/186 |
| | | | 415/115 |
| 2007/0082201 A1 | 4/2007 | Subramanian et al. | |
| 2008/0019836 A1 | 1/2008 | Butz et al. | |
| 2008/0279679 A1 * | 11/2008 | Morrison | F01D 9/042 |
| | | | 415/191 |
| 2009/0004018 A1 | 1/2009 | Dejaune et al. | |
| 2010/0172760 A1 | 7/2010 | Ammann | |
| 2010/0196155 A1 * | 8/2010 | Twell | F01D 9/042 |
| | | | 415/209.3 |
| 2010/0284805 A1 | 11/2010 | Uskert et al. | |
| 2013/0136605 A1 * | 5/2013 | Bart | F01D 5/3084 |
| | | | 416/220 R |
| 2013/0149159 A1 * | 6/2013 | Chuong | F01D 9/042 |
| | | | 416/220 R |

OTHER PUBLICATIONS

U.S. Appl. No. 13/116,156, filed May 26, 2011.
U.S. Appl. No. 13/116,102, filed May 26, 2011.
U.S. Appl. No. 13/116,053, filed May 26, 2011.
U.S. Appl. No. 13/116,129, filed May 26, 2011.
U.S. Appl. No. 13/116,076, filed My 26, 2011.
U.S. Appl. No. 13/116,144, filed May 26, 2011.
U.S. Appl. No. 13/116,093, filed May 26, 2011.
U.S. Appl. No. 13/116,116, filed May 26, 2011.
U.S. Appl. No. 13/116,188, filed May 26, 2011.

* cited by examiner

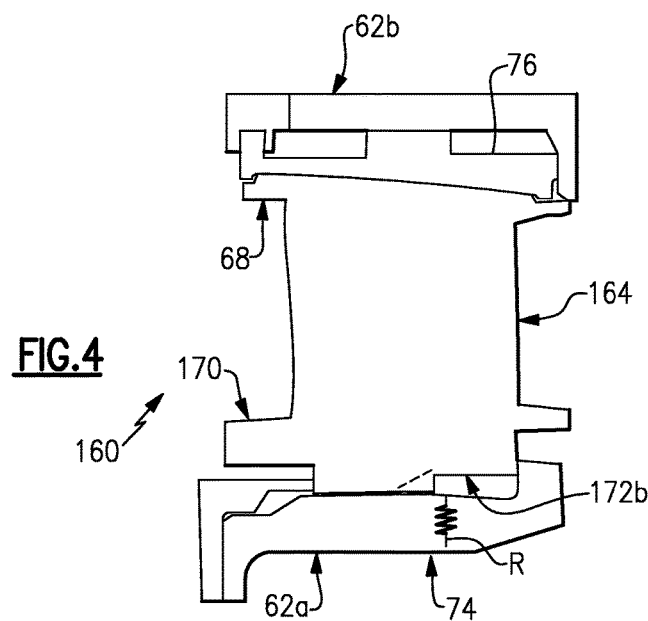
FIG.4
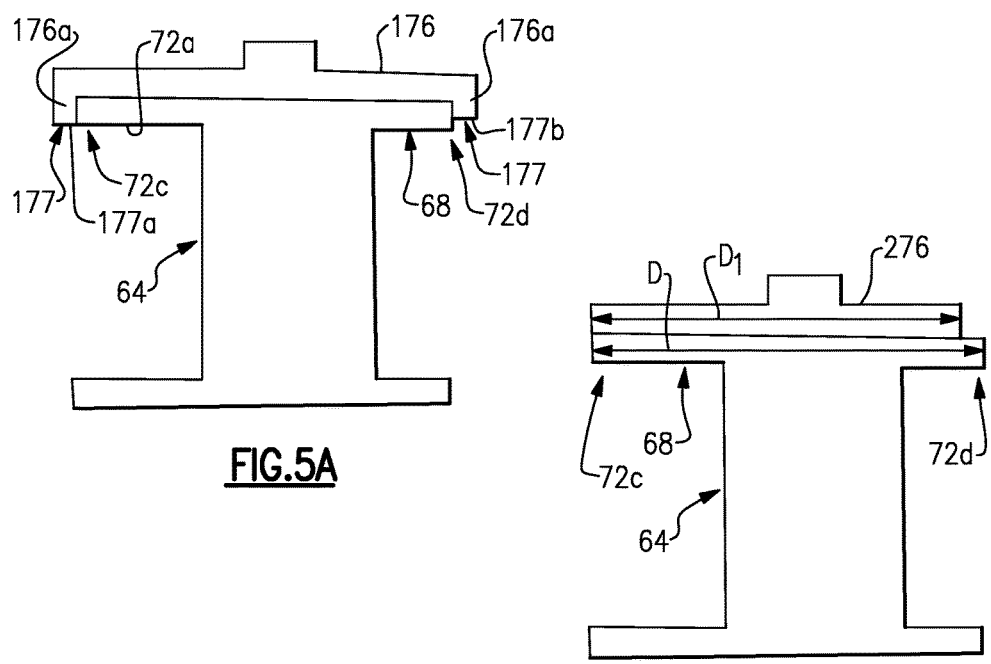
FIG.5A
FIG.5B

VANE ASSEMBLY WITH TRAPPED SEGMENTED VANE STRUCTURES

CROSS-REFERENCE TO RELATED APPLICATION

The present disclosure claims priority to U.S. Provisional Patent Application No. 62/058,801, filed Oct. 2, 2014.

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A vane assembly according to an example of the present disclosure includes inner and outer rings, a plurality of segmented vane structures circumferentially-spaced around a central axis and between the inner and outer rings, and at least one spring mechanically trapping the segmented vane structures in radial compression between the inner and outer rings.

In a further embodiment of any of the foregoing embodiments, the at least one spring is located radially between the vanes and at least one of the inner and outer rings.

A further embodiment of any of the foregoing embodiments includes at least one wedge located radially between the segmented vane structures and at least one of the inner and outer rings such that the wedge causes compression of the at least one spring. A retainer ring is secured to at least one of the inner and outer rings adjacent the wedge. The retainer ring mechanically restricts axial movement of the wedge.

In a further embodiment of any of the foregoing embodiments, the inner and outer rings have a coefficient of thermal expansion differential selected with respect to thermo-mechanically trapping the segmented vane structures in radial compression between the inner and outer rings.

A further embodiment of any of the foregoing embodiments includes at least one joint located radially between the segmented vane structures and at least one of the inner and outer rings. The joint includes a ramp that slants along the axial direction and against which the at least one spring biases the segmented vane structures.

In a further embodiment of any of the foregoing embodiments, the at least one spring is selected from a group consisting of a wave spring, a coil spring, a solid body spring, and a cantilevered beam spring.

In a further embodiment of any of the foregoing embodiments, the at least one spring is a ring with a central opening, the ring being axially retained, with respect to the central axis, by a retainer post extending in the central opening.

In a further embodiment of any of the foregoing embodiments, the at least one spring is a cantilevered beam spring having a cantilevered beam extending in an axial direction, with respect to the central axis, from a base to a free end.

A further embodiment of any of the foregoing embodiments includes a set screw that is adjustable in position with respect to the cantilevered beam to radially flex the cantilevered beam.

A further embodiment of any of the foregoing embodiments includes at least one classified spacer radially between the segmented vane structures and at least one of the inner and outer rings.

In a further embodiment of any of the foregoing embodiments, the at least one classified spacer is axially retained, with respect to the central axis, in a correspondingly-shaped recess.

In a further embodiment of any of the foregoing embodiments, each of the segmented vane structures includes at least one platform having a first core gas-path surface, an opposed radial surface, and leading and trailing ends, at least one of the inner and outer rings having an arm that wraps around at least one of the leading and trailing ends, a tip end of the arm providing a second core gas-path surface adjacent the first core gas-path surface.

In a further embodiment of any of the foregoing embodiments, the second core gas-path surface is radially recessed from the first core gas-path surface.

In a further embodiment of any of the foregoing embodiments, each of the segmented vane structures includes at least one platform having a core gas-path surface, an opposed radial surface, and leading and trailing ends defining an axial platform length, and the one of the inner and outer rings that is nearest the at least one platform is axially shorter than the axial platform length.

In a further embodiment of any of the foregoing embodiments, each of the segmented vane structures is a monolithic piece including an airfoil and inner and outer platforms, each of the inner and outer platforms having a core gas-path surface, an opposed radial surface, and leading and trailing ends, and further including at least one distinct intermediate platform radially trapped between one of the inner and outer platforms and one of the inner and outer rings.

In a further embodiment of any of the foregoing embodiments, the at least one distinct intermediate platform includes a radial tab interlocking with one of the inner and outer platforms or one of the inner and outer rings.

A method for a vane assembly according to the present disclosure includes arranging a plurality of segmented vane structures around a central axis in a circumferentially-spaced arrangement between inner and outer rings, with at least one spring that mechanically traps the segmented vane structures in radial compression between the inner and outer rings.

A vane assembly according to an example of the present disclosure includes a radial stack of inner and outer rings and a plurality of segmented vane structures circumferentially-spaced between the inner and outer rings around a central axis. The radial stack is firmly secured together in radial compression exclusively by friction-fit between the inner and outer rings and the segmented vane structures.

In a further embodiment of any of the foregoing embodiments, the inner and outer rings have a coefficient of thermal expansion differential selected with respect to thermo-mechanically trapping the segmented vane structures in radial compression between the inner ring and the outer ring.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4 illustrates another example vane assembly having a segmented vane structure that directly interfaces with an inner ring.

FIG. 5A illustrates an example intermediate platform that wraps around a platform of a segmented vane assembly.

FIG. 5B illustrates another example intermediate platform that is axially shorter than a platform of a segmented vane assembly.

DETAILED DESCRIPTION

Figure 1:
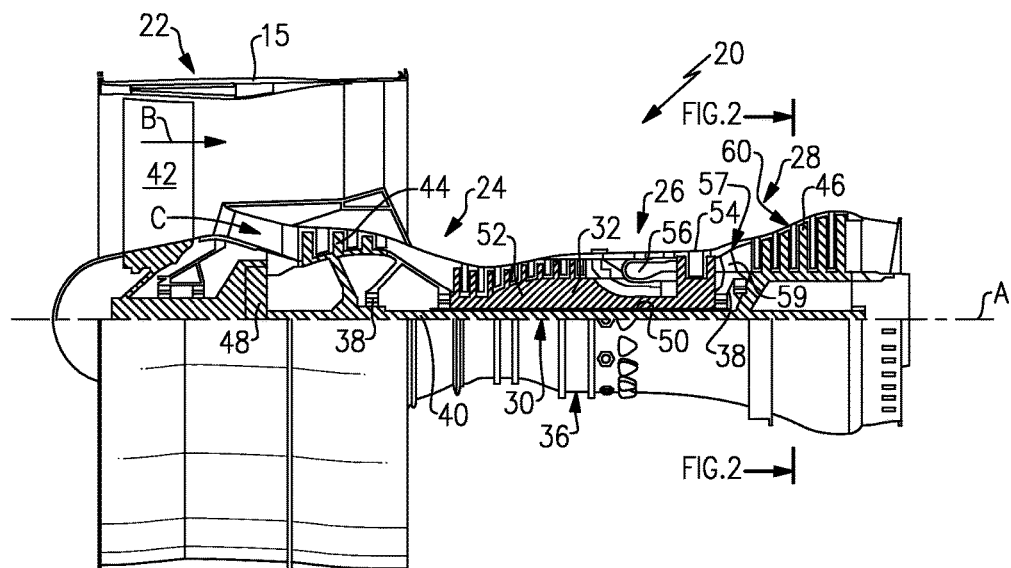
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
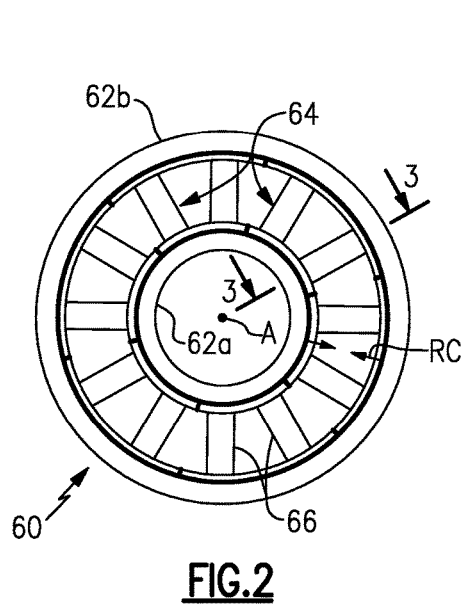
FIG. 2 illustrates an example vane assembly for use in the gas turbine engine of FIG. 1.

As also shown in an isolated, cross-sectional view in FIG. 2, the engine 20 includes a vane assembly 60. In this example, the vane assembly 60 is located within the turbine section 28 of the engine 20. However, the examples herein are not limited to the turbine section 28 and can be applied to other sections of the engine 20.

As will also be evident from the description and figures, the vane assembly 60 can provide a low tensile stress "stack" of components that utilize one or more high temperature materials, particularly for an airfoil. High-temperature materials can include, but are not limited to, monolithic ceramic materials, ceramic matrix composites, metallic alloys including molybdenum-based alloys, and other low-ductility and/or low coefficient of thermal expansion materials. High temperature materials can increase the maximum operational temperature within the turbine section 28. However, a potential drawback is that the low ductility of these materials, at least relative to known nickel-based alloys used in airfoils, makes them more susceptible to damage from tensile stresses. In this regard, the vane assembly 60 provides a relatively low stress arrangement such that high-temperature materials can be used.

Figure 3:
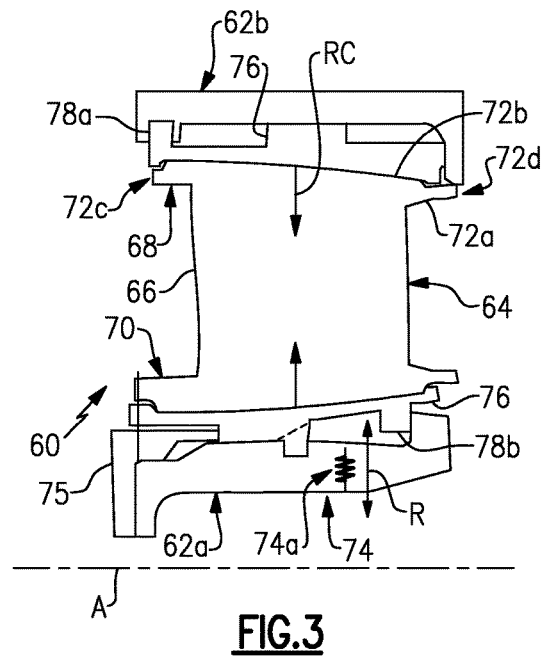
FIG. 3 illustrates a sectioned view of the vane assembly of FIG. 2.

The vane assembly 60 includes an inner ring 62a, an outer ring 62b, and a plurality of segmented vane structures 64 arranged around the central engine axis A and circumferentially-spaced between the inner and outer rings 62a/62b. As an example, either one or both of the rings 62a/62b can be continuous or continuous and monolithic. Referring also to the sectioned view of the vane assembly 60 in FIG. 3, each of the segmented vane structures 64 includes an airfoil 66 and inner and outer platforms 68/70. Each of the platforms 68/70 includes a core gas-path surface 72a, an opposed radial surface 72b, and leading and trailing ends 72c/72d.

In a further example, each of the segmented vane structures 64 is a monolithic piece that includes the airfoil 66 and the platforms 68/70. A monolithic piece has no seams from mechanical joints or welds.

Each segmented vane structure 64 can include multiple airfoils 66. As shown in FIG. 2, each of the segmented vane structures 64 in this example includes two airfoils 66. Alternatively, in any of the examples herein, the segmented vane structures 64 can include only a single airfoil 66 or more than two airfoils 66.

The segmented vane structures 64 are mechanically trapped in radial compression, as represented at RC, between the inner and outer rings 62a/62b. In this regard, at least one spring 74 functions to mechanically trap the segmented vane structures 64 in radial compression. As can be appreciated, a single continuous annular spring could be used to trap all of the segmented vane structures 64 or, alternatively, a plurality of individual springs 74 could be used such that one of more individual springs 74 serve to mechanically trap each segmented vane structure 64.

In one further example, the spring 74 firmly secures together the segmented vane structures 64 in a stack with the inner and outer rings 62a/62b exclusively by friction-fit between the inner and outer rings 62a/62b in the segmented vane structures 64 and held in place by a snap ring 75, for example.

As can be appreciated, the type and location of the spring 74 can be varied. In the example shown in FIG. 3, rather than having a separate distinct spring, the inner ring 62a serves as the spring 74, as represented at 74a. Thus, the functionality of a spring is designed into the inner ring 62, which can flex in a generally radial direction, as represented at R, to mechanically trap the segmented vane structures 64 in radial compression. In this regard, the geometry and/or material of the inner ring 74a can be selected to provide a desired spring rate, as in the illustrated example where the inner ring 74a is a cantilevered arm.

In the illustrated example, the vane assembly 60 also includes one or more intermediate platforms 76 that are radially trapped between one of the inner and outer platforms 68/70 and one of the inner and outer rings 62a/62b. In this example, the vane assembly 60 includes a distinct intermediate platform 76 between platform 68 and outer ring 62b and also another intermediate platform 76 between platform 70 and inner ring 62a. The intermediate platforms 76 are optional and may serve as structural reinforcement and/or to influence thermal transfer within the vane assembly 60, as well as facilitating the interference-fit in the stack.

As a further example, the intermediate platforms 76 can include one or more interference-fit members 78a/78b that facilitate securing the segmented vane structures 64 in the stack. For example, the interference-fit member 78a is a radially-extending tab that is received into a corresponding recess in the outer ring 62b. In this example, the interference-fit member 78a is a two-way interlocking tab in that the interlocking between the tab in the corresponding recess restricts movement in the forward and aft axial directions. In contrast, the interference-fit member 78b is also a tab but is a one-way tab in that the corresponding recess into which the tab is received in the inner ring 6a restricts axial movement only the aft axial direction. As can be appreciated, the tab or tabs can alternatively be provided on the inner and outer rings 62a/62b and the corresponding recesses can alternatively be provided on the intermediate platforms 76. In further examples, where the intermediate platforms 76 are not used, the interference-fit members 78a/78b can be provided directly on the radial surfaces 72b of the platforms 68/70 of the segmented vane structures 64.

In the examples herein, the segmented vane structures 64 can be formed of a low ductility/low coefficient of thermal expansion material, as described above. In contrast, the inner and outer rings 62a/62b are formed of a different, higher ductility, higher coefficient of thermal expansion material or materials. The material or materials selected for the inner and outer rings 62a/62b may be the same in composition or different in composition from each other. In a further example, the material selected for the inner ring 62a has a higher coefficient of thermal expansion than the outer ring 62b such that there is a coefficient of thermal expansion differential. This differential can be selected with respect to thermo-mechanically trapping the segmented vane structures 64 in radial compression between the inner and outer rings 62a/62b, especially during high-temperature operation of the engine 20. Thus, in use, such as at cruise of the engine 20, the elevated temperatures in the turbine section 28 cause thermal growth of the inner and outer rings 62a/62b and the segmented vane structures 64. The segmented vane structures 64 thermally expand at a lower rate than the inner and outer rings 62a/62b. However, the higher coefficient of thermal expansion material selected for the inner ring 62a causes a relatively larger degree of thermal expansion of the inner ring 62a such that a compressive force is exerted on the stack, thus maintaining the stack in compression during this high temperature state. In similar regard, the coefficients of thermal expansion of the materials selected for the inner and outer rings 62a/62b and the segmented vane structures 64 can be selected according to selected flight/temperature conditions, or across all high-temperature conditions such that the stack remains in compression overall operating conditions.

FIG. 4 illustrates another example vane assembly 160. In this disclosure, like reference numerals designate like elements where appropriate and reference numerals with the addition of one-hundred or multiples thereof designate modified elements that are understood to incorporate the same features and benefits of the corresponding elements. In this example, the vane assembly 160 excludes the intermediate platform 76 that was located between the platform 70 and the inner ring 62a in FIG. 3. Instead, some or all of the features that were previously provided on the intermediate platform 76 are integrated into the segmented vane structure 164 such that those features are now present on the radial surface 172b of the platform 170. Whereas the intermediate platform 76 of the vane assembly 60 in FIG. 3 may serve as mechanical reinforcement and/or to manage thermal transfer, the segmented vane structure 164 in this example is in direct mechanical and thermal interface with the inner ring 62a. Since the segmented vane structure 164 is directly exposed to the core gas-path C of the engine 20 and is in direct interface with the inner ring 62a, there is a direct thermal path to the inner ring 62a. In other words, thermal loads can more readily be transferred into and from the inner ring 62a. Thus, the design with direct interface between the segmented vane structure 164 and the inner ring 62a can be used to manage thermal loads and thermal growth and contraction of the inner ring 62a, to maintain the stack and radial compression and/or provide a desired degree of radial compression at selected operating conditions.

In a further example shown in FIG. 5A, an example segmented vane structure 64 is shown with another example intermediate platform 176. For purpose of description, other surrounding components are excluded from the view. In this example, the intermediate platform 176 includes one or more arms 176a that wrap around at least one of the leading and trailing ends 72c/72d of the platform 68 of the segmented vane structure 64. A tip end 177 of the arm 176a at the leading end 72c provides a core gas-path surface 177a adjacent the core gas-path surface 72a of the platform 68. In this example, the core gas-path surface 177a at the tip 177 is radially flush with the core gas-path surface of the platform 68.

Also in FIG. 5A, the arm 176a at the trailing end 72d of the platform 68 has a core gas-path surface 177b, but the surface 177b is radially recessed with respect to the core gas-path surface 72a of the platform 68. As can be appreciated, the surfaces 177a and 177b can be used at any of the leading or trailing ends of the platforms 68/70 to manage thermal loads in the vane assembly 60. For example, the surface 177a that is flush has greater exposure to the core gas-path, while the surface 177b, because it is recessed, has less exposure and thus less thermal transfer.

In further examples shown in FIG. 5B, the segmented vane structure 64 includes an axial distance, D, between the leading end 72c and the trailing end 72d. In this example, the intermediate platform 276 also has an axial distance $D_1$ between its leading and trailing edges. The axial distance $D_1$ of the intermediate platform 276 is smaller than the axial distance D of the platform 68 of the segmented vane structure 64. Again, similar to the example of FIG. 5A, the geometry of the intermediate platform 276 can be designed to manage thermal loads in the vane assembly 60. In this regard, the axially shorter intermediate platform 276 has no direct exposure to the core gas-path and thus has relatively low thermal transfer.

Figure 6A:
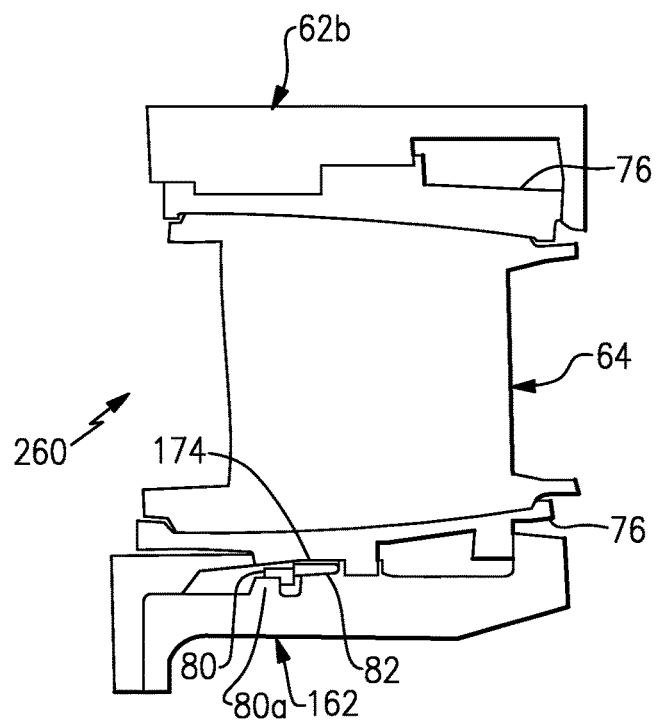
FIG. 6A illustrates another example vane assembly that includes a wedge engaging a spring.
Figure 6B:
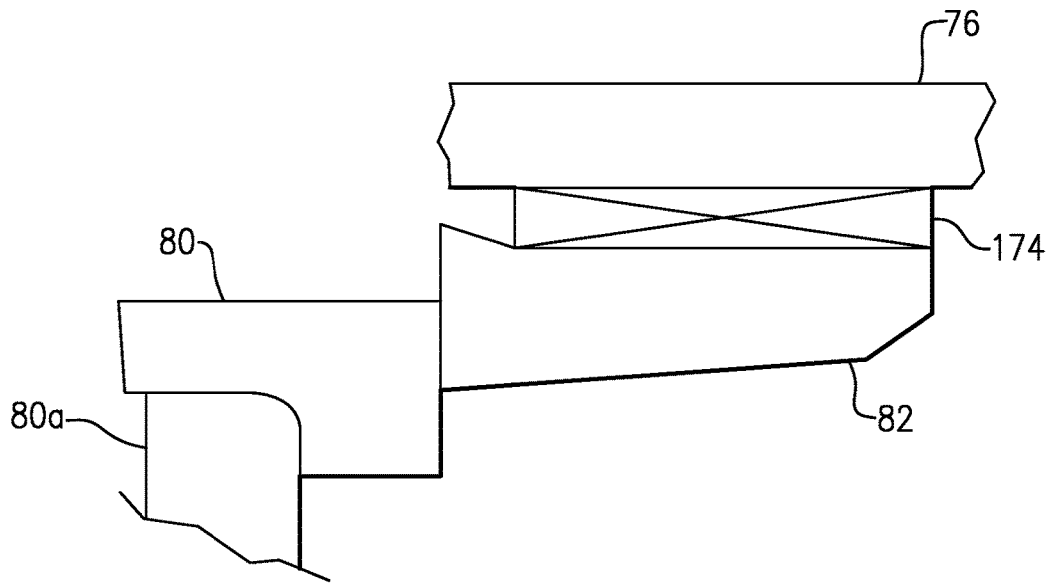
FIG. 6B illustrates an isolated view of the wedge and spring of FIG. 6A.

FIG. 6A shows another example vane assembly 260. In this example, the vane assembly 260 includes a retainer ring 80, a wedge 82, and a spring 174 that cooperates with the wedge 82 and retainer ring 80 to maintain the stack in radial compression. FIG. 6B shows the area of the retainer ring 80 and wedge 82. The retainer ring 80 can be a full, continuous ring, or a split ring that engages a corresponding tab 80a on inner ring 162a to retain the wedge 82 in a desired position. The wedge 82 is located radially between the segmented vane structure 64 and the inner ring 162a in this example. As can be appreciate, a similar retainer ring, wedge, and spring, can alternatively or additionally be used between the segmented vane structure 64 and the outer ring 62b. The retainer ring 80 locks against the corresponding tab 80a and thus continuously urges the wedge 82 in an axial direction (to the right in FIGS. 6A/6B) such that the wedge 82 exerts a continuous compressive force on the spring 174. The spring 174 thus maintains a constant radial compression on the stack in the vane structure 260, which may also facilitate assembly of the stack prior to exposure to engine operating temperatures.

Figure 7A:
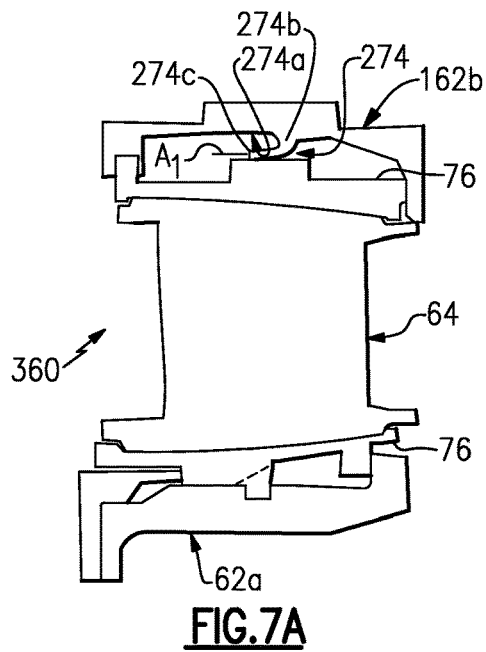
FIG. 7A illustrates another example vane assembly that has a cantilevered beam spring.
Figure 7B:
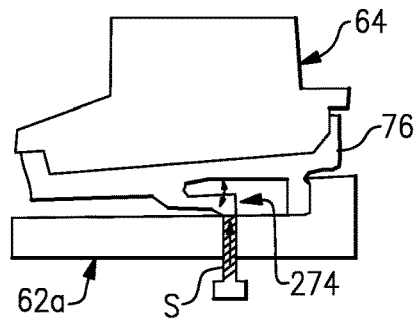
FIG. 7B illustrates another example in which a set screw interfaces with a cantilevered beam spring.

FIG. 7A illustrates another example vane assembly 360. In this example, the vane assembly 360 includes a cantilevered beam spring 274 that functions to maintain the stack under constant radial compression. The spring 274 includes a cantilevered beam 274a that generally extends along a central axis, $A_1$, between a base 274b and a free end 274c. The cantilevered beam 274a is operable to flex radially to exert a radial compression on the stack of the vane assembly 360. In a further example illustrated in FIG. 7B, the cantilevered beam spring 274 can be located near the inner ring 62a. Additionally, in either of FIG. 7A or 7B, a set screw S can be threaded through a corresponding member, such as the inner ring 62a, to selectively engage and bias the cantilevered beam spring 274. In this regard, the compression of the cantilevered beam spring 274 can be adjusted and set to a desired amount by adjusting the position of the set screw S.

Figure 7C:
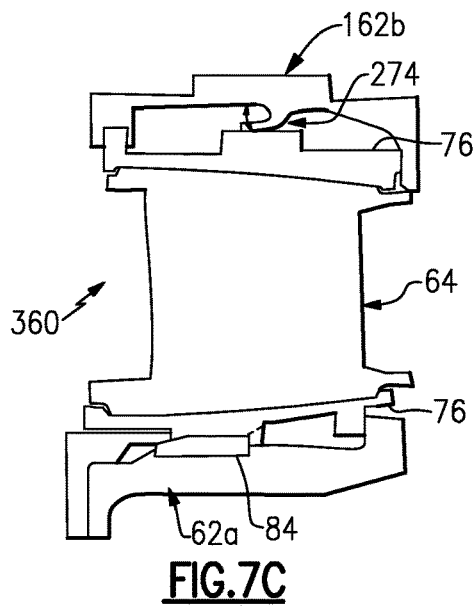
FIG. 7C illustrates another example vane assembly having a cantilevered beam spring and a classified spacer.

FIG. 7C illustrates another example that is similar to the example of FIG. 7A but includes a classified spacer 84 that is mechanically trapped radially between the segmented vane structure 64 and the inner ring 62a. As can be appreciated, the classified spacer 84 can alternatively be located radially between the segmented vane structure 64 and the outer ring 162b, and multiple classified spacers can be used in selected locations. A classified spacer is one which is selected from a group of different, preset size classes in accordance with a determined spacing in the stack. For examples, manufacturing tolerances in the components can lead to a variation in spacing in the stack. The classified spacer 84 can be selected from the size classes in accordance with spacing from such tolerances.

Figure 8A:
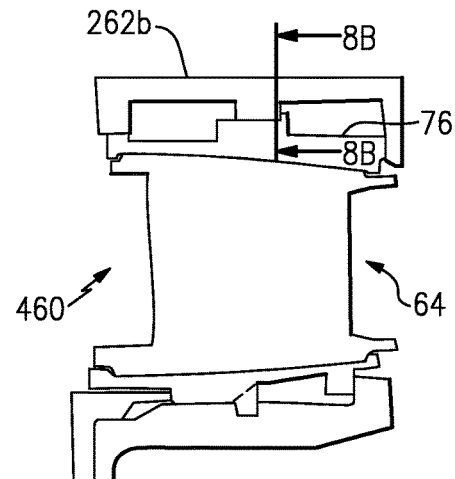
FIG. 8A illustrates another example vane assembly that includes a classified spacer.
Figure 8B:
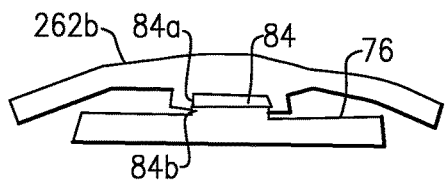
FIG. 8B illustrates an isolated view of the classified spacer area of FIG. 8A.

FIGS. 8A and 8B illustrate another example vane assembly 460 in which the classified spacer 84 is located at the radially outward end of the segmented vane structure 64 between the intermediate platform 76 and outer ring 262b. In this example, the classified spacer 84 is trapped within a recess 84a in the outer ring 262b by a protruding tab 84b that extends from the intermediate platform 76. As can be appreciated, the recess 84a could alternatively be provided on the intermediate platform 76 and the tab 84b on the outer ring 262b.

Figure 9A:
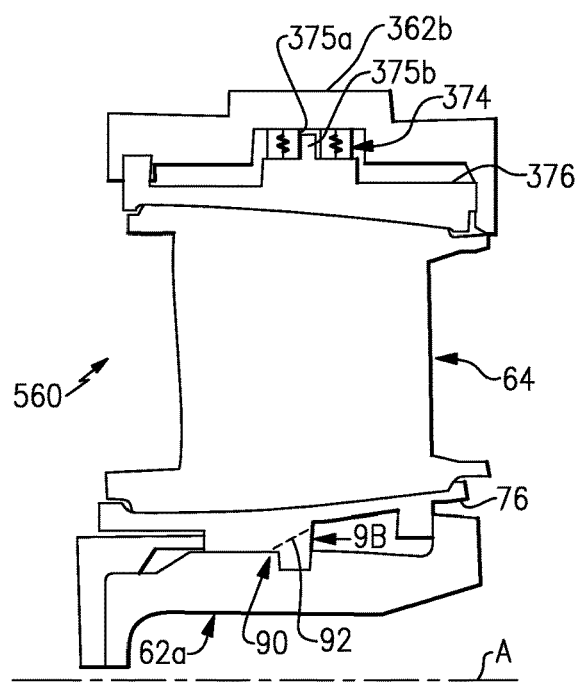
FIG. 9A illustrates another example vane assembly having a spring that is retained by a retainer post and a ramp against which the spring biases a segmented vane structure.

FIG. 9A illustrates another example vane assembly 560. In this example, the vane assembly 560 includes one or more springs 374. Here, the spring 374 is located radially between the segmented vane structure 64 and the outer ring 362b. Specifically, the spring 374 is radially between the outer ring 362b and intermediate platform 376.

In this example, the spring 374 is a ring that has a central opening 375a. The ring is axially retained, with respect to the central engine axis A, by a retainer post 375b extending in the central opening 375a. In this example, the retainer post 375b is an extension of the intermediate platform 376. As can be appreciated, the retainer post 375b could alternatively be on the outer ring 362b. In another alternative, the spring 374 and retainer post 375b could instead be situated at the radially inner end of the segmented vane structure 64.

The spring 374 radially compresses the stack of the vane assembly 560. In this case, the vane assembly 560 includes a joint 90 located radially between the segmented vane structure 64 and at least one of the inner and outer rings 62a/362b. In this example, the joint 90 is located radially between the segmented vane structure 64 and the inner ring 62a. The joint 90 includes a ramp 92 that slants in a radial direction as a function of distance along the axial direction, with respect to the central engine axis A, and against which the spring 374 biases the segmented vane structure 64 to maintain compression.

Figure 9B:
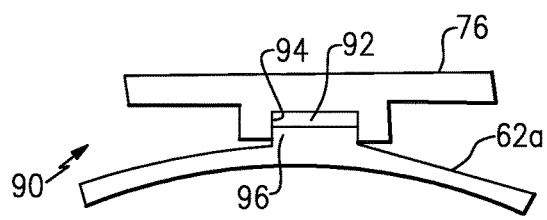
FIG. 9B illustrates an axial view of the ramp of the vane assembly of FIG. 9A.

FIG. 9B illustrates an axial view of the joint 90. The ramp 92 is the interface between the intermediate platform 76 and the inner ring 62a. Additionally, the ramp 92 in this example is located within a recess 94 and interfaces with a tab 96 on the inner ring 62a. Alternatively, the recess 94 could be on the inner ring 62a and the tab 96 on the intermediate platform 76. In a further alternative, the joint 90 could instead or additionally be located at the radially outer end of the segmented vane structure 64.

Figure 10A:
FIG. 10A illustrates a wave spring.
Figure 10B:
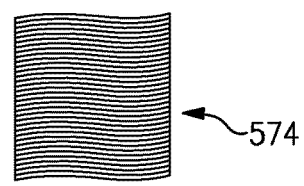
FIG. 10B illustrates a helical coil spring.
Figure 10C:
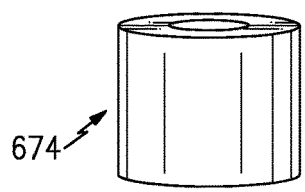
FIG. 10C illustrates a solid body spring.

FIG. 10A, FIG. 10B, and FIG. 10C illustrate, respectively, additional example springs 474/574/674. The spring 474 is an annular wave spring; the spring 574 is a helical coil spring; and the spring 674 is a solid body spring. For example, the solid body spring is formed of a material and with a geometry that provides a desired spring rate with respect to the forces present in the stack of the vane assembly 560 under selected operating conditions.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A vane assembly comprising:
   inner and outer rings;
   a plurality of segmented vane structures circumferentially-spaced around a central axis and between the inner and outer rings, each of the plurality of segmented vane structures including an airfoil and inner and outer platforms;
   at least one distinct intermediate platform radially trapped between one of the inner and outer platforms and one of the inner and outer rings, wherein the at least one distinct intermediate platform includes one or more interference-fit members configured to secure the plurality of segmented vane structures to at least one of the inner and outer rings;
   at least one spring radially between the plurality of segmented vane structures and at least one of the inner and outer rings mechanically trapping the plurality of segmented vane structures in radial compression between the inner and outer rings; and
   wherein the inner and outer rings have a coefficient of thermal expansion differential selected with respect to thermo-mechanically trapping the plurality of segmented vane structures in radial compression between the inner and outer rings.

2. The vane assembly as recited in claim 1, further comprising at least one wedge located radially between the plurality of segmented vane structures and at least one of the inner and outer rings such that the wedge causes compression of the at least one spring, and a retainer ring secured to at least one of the inner and outer rings adjacent the wedge, the retainer ring mechanically restricting axial movement of the wedge.

3. The vane assembly as recited in claim 1, further comprising at least one joint located radially between the plurality of segmented vane structures and at least one of the inner and outer rings, the at least one joint including a ramp that slants along the axial direction and against which the at least one spring biases the plurality of segmented vane structures.

4. The vane assembly as recited in claim 1, wherein the at least one spring is selected from the group consisting of a wave spring, a coil spring, a solid body spring, and a cantilevered beam spring.

5. The vane assembly as recited in claim 1, wherein the at least one spring is a ring with a central opening, the ring being axially retained, with respect to the central axis, by a retainer post extending in the central opening.

6. The vane assembly as recited in claim 1, wherein the at least one spring is a cantilevered beam spring having a cantilevered beam extending in an axial direction, with respect to the central axis, from a base to a free end.

7. The vane assembly as recited in claim 6, further comprising a set screw that is adjustable in position with respect to the cantilevered beam to radially flex the cantilevered beam.

8. The vane assembly as recited in claim 1, further comprising at least one classified spacer radially between the plurality of segmented vane structures and at least one of the inner and outer rings.

9. The vane assembly as recited in claim 8, wherein the at least one classified spacer is axially retained, with respect to the central axis, in a correspondingly-shaped recess.

10. The vane assembly as recited in claim 1, wherein at least one of the inner and outer platforms includes a first core gas-path surface, an opposed radial surface, and leading and trailing ends, at least one of the inner and outer rings having an arm that wraps around at least one of the leading and trailing ends, a tip end of the arm providing a second core gas-path surface adjacent the first core gas-path surface.

11. The vane assembly as recited in claim 10, wherein the second core gas-path surface is radially recessed from the first core gas-path surface.

12. The vane assembly as recited in claim 1, wherein at least one of the inner and outer platforms includes a core gas-path surface, an opposed radial surface, and leading and trailing ends defining an axial platform length, and the one of the inner and outer rings that is nearest the at least one platform is axially shorter than the axial platform length.

13. The vane assembly as recited in claim 1, wherein each of the plurality of segmented vane structures is a monolithic piece including the airfoil and the inner and outer platforms, each of the inner and outer platforms having a core gas-path surface, an opposed radial surface, and leading and trailing ends.

14. The vane assembly as recited in claim 13, wherein the the one or more interference-fit members includes a radial tab interlocking with one of the inner and outer platforms or one of the inner and outer rings.

15. A method for a vane assembly, the method comprising:

arranging a plurality of segmented vane structures around a central axis in a circumferentially-spaced arrangement between inner and outer rings, with at least one spring radially between the plurality of segmented vane structures and at least one of the inner and outer rings that mechanically traps the plurality of segmented vane structures in radial compression between the inner and outer rings, wherein the inner and outer rings have a coefficient of thermal expansion differential selected with respect to thermo-mechanically trapping the plurality of segmented vane structures in radial compression between the inner ring and the outer ring, wherein each of the plurality of segmented vane structures includes an airfoil and inner and outer platforms, and at least one distinct intermediate platform radially trapped between one of the inner and outer platforms and one of the inner and outer rings, wherein the at least one intermediate platform includes one or more interference-fit members configured to secure the plurality of segmented vane structure to at least one of the inner and outer rings.

* * * * *